UNITED STATES PATENT OFFICE.

HARRY WEHRLIN, OF STEGLITZ, NEAR BERLIN, GERMANY.

PROCESS OF TREATING THE ANODE-MUD RESULTING FROM ELECTROLYTIC REFINING.

1,049,013.

Specification of Letters Patent. Patented Dec. 31, 1912.

No Drawing. Application filed December 26, 1911. Serial No. 667,786.

*To all whom it may concern:*

Be it known that I, HARRY WEHRLIN, a citizen of the Swiss Republic, and a resident of Steglitz, near Berlin, Germany, have invented a new and useful Improvement in Processes of Treating the Anode-Mud Resulting from Electrolytic Refining, of which the following is a specification.

In the electrolytic refining of various metals such as lead or copper there is formed an anode mud which as a rule consists chiefly of lead, antimony, copper, arsenic and precious metals. This mud is generally treated by means of suitable oxidizing agents and acids so as to convert it partly into soluble and partly into insoluble compounds, thus dividing it into two portions or groups which are subsequently sub-divided in turn and finally converted into pure metals or compounds. In the methods practised hitherto the first division into two groups resulted in the production of one group containing copper and arsenic in solution and a second group containing the other constituents. The separation of antimony from lead and the precious metals required a further treatment in the course of which antimony was dissolved and thus removed. Another method used hitherto consisted in removing gold and silver by filtration after a preliminary chlorination of the mud and then dividing the metals remaining in solution into three groups by distillation, precipitation and filtration. Inasmuch as the chlorids of arsenic and antimony do not become volatile until a temperature far above the boiling point of water is reached, this subdivision or separation necessitated a preliminary evaporation or condensing of the solution and the redissolving of the distillation residue in order to separate the latter into constituents susceptible of being precipitated and those not yielding to such treatment.

My present invention relates to a method of treating a substance or mud of the character specified above according to which the mud will be split up or subdivided into three groups by a single operation without any preliminary removal of any constituents and without any necessity for evaporating or condensing solutions; these three groups are: A. Lead and precious metals. B. Antimony and copper. C. Arsenic.

The process is carried out for example by subjecting the mud simultaneously to the action of sulfuric acid, hydrofluoric acid, and an oxidizing agent or oxidant; preferably the mud, in a mixture of diluted sulfuric acid and hydrofluoric acid, is heated for a considerable length of time to a temperature of about 70° C., while passing a current of air through the liquid. The precious metals are not affected by this treatment, but lead is transformed into the insoluble lead sulfate, copper and antimony are dissolved under formation of their sulfates and fluorids; and arsenic is distilled over in the form of its fluorin compound and is then recovered by condensing the vapors. Copper and antimony are separated from the insoluble residue by removing the latter by filtration and then washing it. The metals of the group A, that is to say, the precious metals and lead (in the form of lead sulfate) are separated in the well known manner by a metallurgical treatment. From the solution of the metals in group B, I recover first copper and then antimony by electrolysis in the well known manner. Finally the fluorin compound of arsenic is preferably decomposed by the action of hydrogen sulfid, thus liberating the hydrofluoric acid which is combined with arsenic, and this liberated hydrofluoric acid together with any excess of such acid which has been distilled over is returned to the initial stage of the process.

By comparing the new process just described with the former processes mentioned at the beginning of this specification, it will be seen that my invention simplifies and cheapens considerably the treatment of the anode mud, the advantage of the new process residing chiefly in the fact that the subdividing of the original mud into three groups of metals is accomplished in a single operation without requiring the evaporation or condensing of the distillation residue.

Various modifications may be made without departing from the nature of my invention as set forth in the appended claims.

I claim as my invention:

1. In the treatment of arsenic bearing anode mud resulting from electrolytic refining, the process which consists in converting the arsenic into a fluorin compound and distilling at a temperature below the boiling point of water.

2. In the treatment of anode mud which contains precious metals, lead, copper, antimony and arsenic, the process which consists in heating such mud in the presence of a mixture of sulfuric acid, hydrofluoric acid and an oxidizing agent, thereby dividing the mud into three groups, the first containing the precious metals and lead sulfate undissolved, while the second contains copper and antimony as dissolved sulfates and fluorids, and the third contains arsenic in the form of a volatile distilled fluorid.

3. The process of separating the constituents of mixtures, which consists in treating the mixture simultaneously with an oxidant and two agents one of which has the property of bringing some of the said constituents into a dissolved condition, while the other has the property of bringing another portion of the mixture into a condition in which it may be removed by distillation, the operation being conducted at a temperature sufficient to effect distillation of the second-named agent and the portion of the mixture contained therein, but not sufficient to remove the first-named agent and the substances contained therein.

4. The process of separating the constituents of mixtures, which consists in treating the mixture simultaneously with an oxidant and two agents at a temperature intermediate between the boiling points of said agents, one of said agents having the property of bringing a portion of the constituents into a dissovled condition, while the other agent has the property of bringing another portion of the mixture into a condition in which it may be removed by distillation.

In testimony whereof, I have hereunto set my hand in the presence of two subscribing witnesses.

HARRY WEHRLIN.

Witnesses:
  HENRY HASPER,
  WOLDEMAR HAUPT.